Feb. 26, 1963
O. W. SEPP, JR
3,079,114
PARACHUTE REEFING RING MOUNTINGS AND THE
METHOD OF INSTALLING SAME
Filed June 3, 1960
3 Sheets-Sheet 1
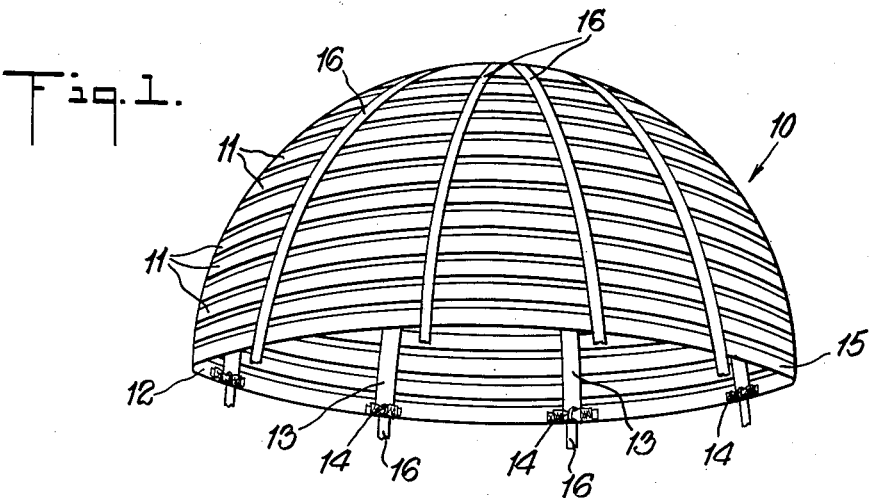
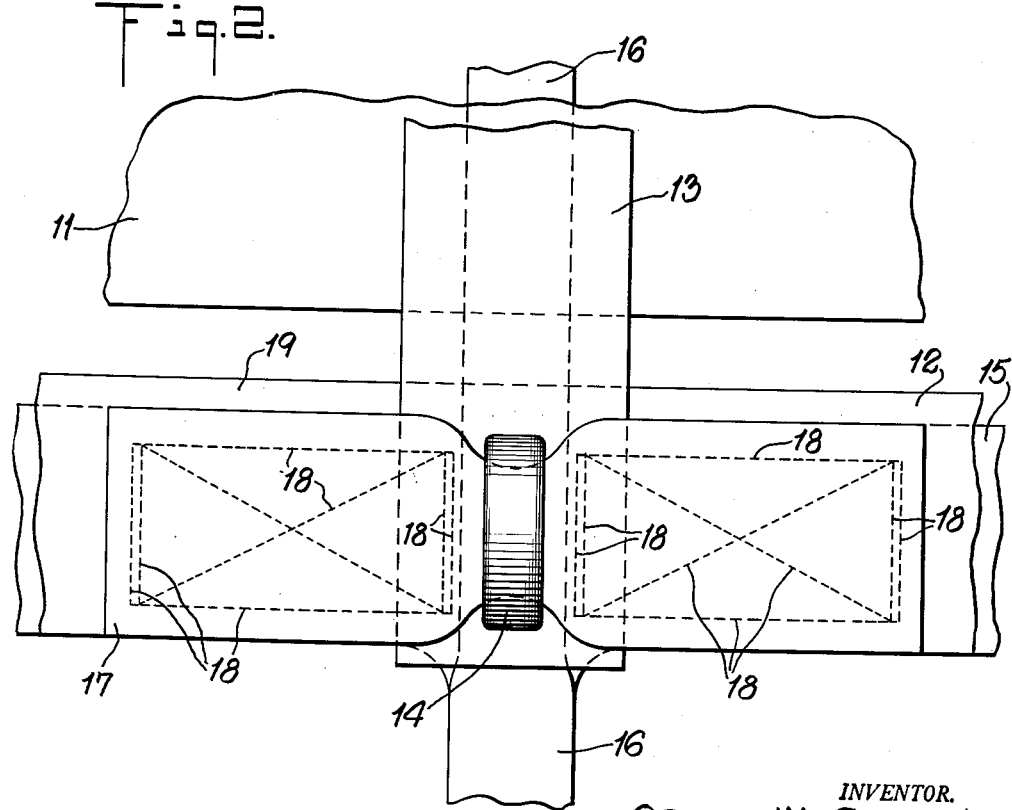
INVENTOR.
OSCAR W. SEPP, JR.
BY
ATTORNEYS

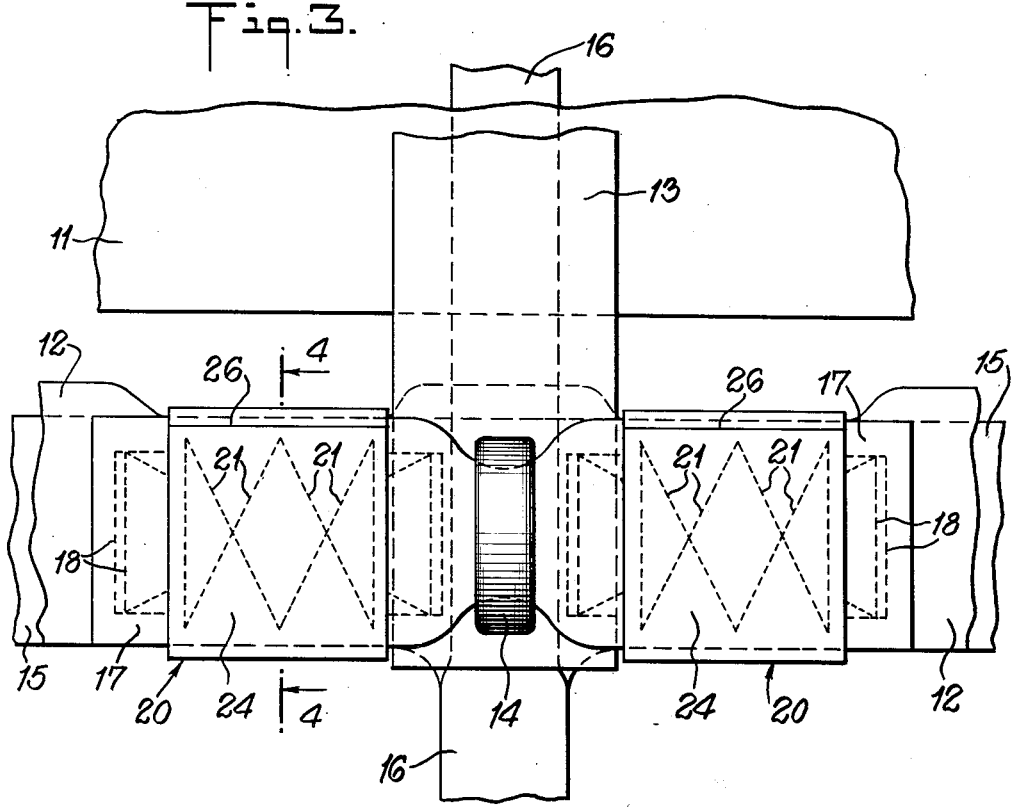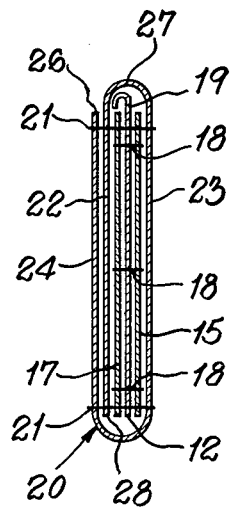

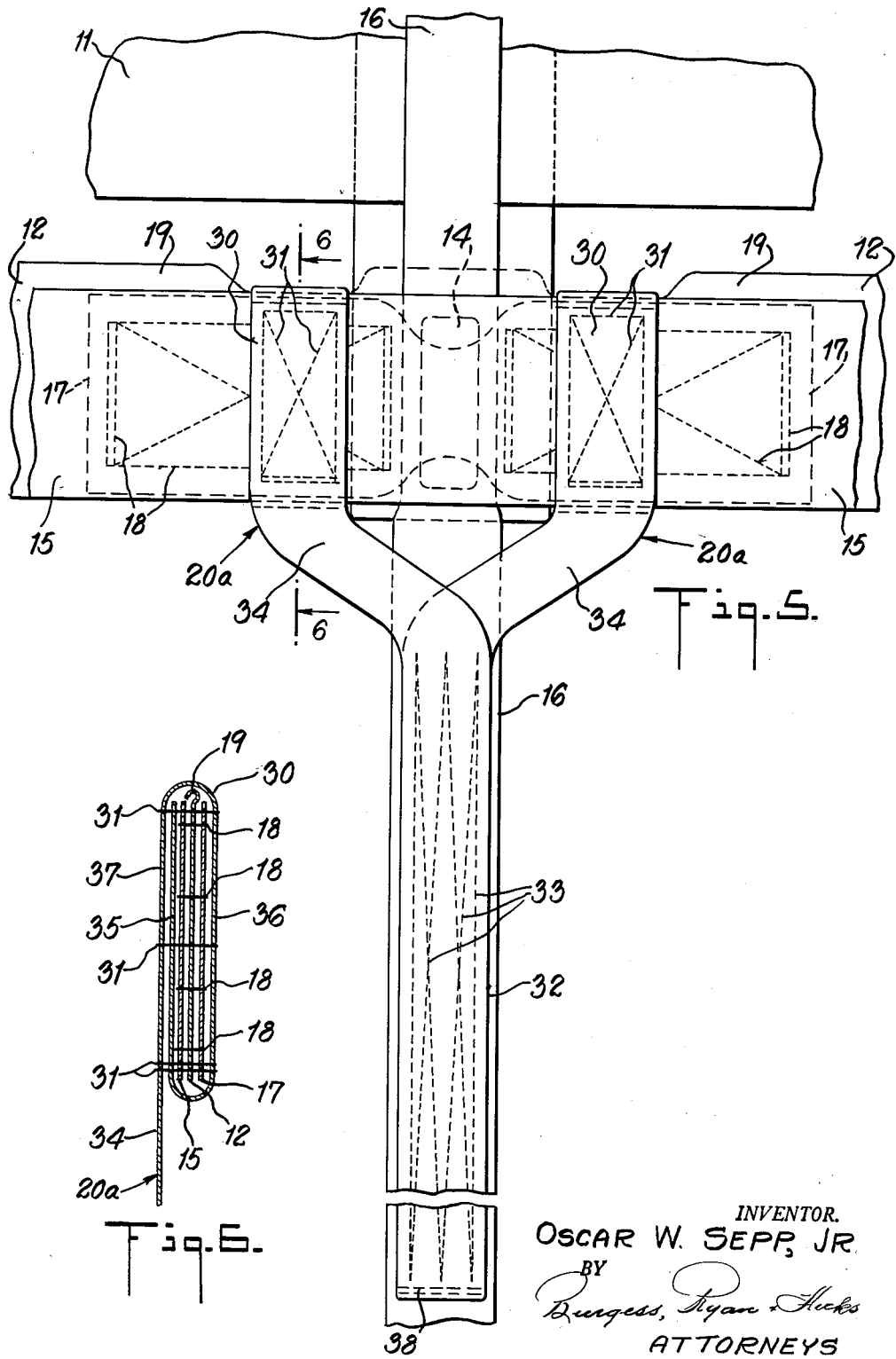

United States Patent Office 3,079,114
Patented Feb. 26, 1963

3,079,114
PARACHUTE REEFING RING MOUNTINGS AND
THE METHOD OF INSTALLING SAME
Oscar W. Sepp, Jr., Dayton, Ohio, assignor to M. Steinthal & Co., Inc., New York, N.Y., a corporation of New York
Filed June 3, 1960, Ser. No. 33,670
7 Claims. (Cl. 244—152)

The present invention relates to parachute reefing ring mountings and a method of installing the same.

In certain types of parachutes, such as cargo ribbon parachutes, it is desirable to restrict the initial opening of the parachute so as to reduce the impact to which it is subjected. Ordinarily, this is accomplished by means of a reefing cord which is attached to the skirt or lower band of the parachute by means of reefing rings in such a way that the opening of the parachute can be restricted as desired.

An object of the present invention is to provide a new and improved parachute reefing ring mounting, which is free of all rigid parts or attachments, such as metal mounting plates, or metal fastening pins, studs or rivets, which is compact but nevertheless strong, which does not weaken the fabric parts of the parachute, which in addition to serving as a means for supporting the reefing ring also serves to fasten together more securely the different lapping webs and fabrics of the parachute at the reef-points, and which is comparatively inexpensive and easy to install.

Another object of the invention is to provide a new and improved method of installing reefing rings on a parachute.

Other objects and advantages of the present invention will be apparent and better understood from the following description and from the accompanying drawings, in which:

FIG. 1 is a perspective of a fully inflated ribbon type parachute having reefing rings installed thereon in accordance with one embodiment of the present invention.

FIG. 2 is a front inside elevational detail view of the parachute at a reef-point and shows a reefing ring at one stage of its installation in accordance with the embodiment of the invention shown in FIG. 1;

FIG. 3 is a front inside elevational detail view of the parachute at a reef-point similar to that of FIG. 2 but shows the reefing ring at a final stage of its installation in accordance with the embodiment of the invention shown in FIG. 1;

FIG. 4 is a section view taken along line 4—4 of FIG. 3;

FIG. 5 is a rear outside elevational detail view of the parachute at a reef-point illustrating another embodiment of the invention; and FIG. 6 is a section view taken along the lines 6—6 of FIG. 5.

FIG. 1 shows a type of parachute 10 to which the reefing ring mountings of the present invention can be applied. This parachute 10 is shown of the ribbon type comprising a series of circumferential ribbons 11 and 12 secured together in predetermined spaced relationship by radial ribbons to form the canopy of the parachute 13. The bottom circumferential ribbon or skirt band 12 spaced from the body of the canopy defines the mouth or opening of the parachute and reefing rings 14 at reef-points are attached to the skirt band on the inside of the parachute in the manner to be described. The bottom ribbon or skirt band 12 is reinforced by a ribbon or webbing 15 (FIG. 2) which is narrower than the bottom skirt band 12 and which is stitched thereto with its lower edge in registry with the lower edge of the skirt band 12. Stitched to the reinforced skirt band 12 and to the radial ribbons 13 respectively are shroud or suspension lines 16 for the parachute, shown in the form of webs.

The parachute 10, for example, may be of the cargo type, and the band defining the mouth of the parachute is constructed so that it may be drawn and gathered together by a reefing cable or rope (not shown) threaded through the reefing rings 14, to restrict the initial opening of the parachute and thus, reduce the impact when the parachute first opens. The reefing cable may be released, as for example, automatically after a predetermined period of descent, to permit full opening of the parachute and when its initial speed has been reduced.

The reefing rings 14 are attached to the skirt band 12 at reef-points at the bases of the radial ribbons 13 respectively. Thus, at each reef-point, the skirt band 12 is reinforced by the ribbon 15, the corresponding radial ribbon 13 and the corresponding suspension web 16, all of these being stitched together in face to face contact. The different fabrics and webbings that go to make up the parachute, including the ribbons 11, 12, 13 and 15 and the suspension webs 16 are advantageously of nylon, and the stitchings described are preferably with nylon thread. The parachute constructed, as described, affords strong mounting sites at the reef-points for the reefing rings 14.

Each reefing ring 14 is circular and is made of metal or other suitable material. In the process of installing the ring, it is slipped over a ring retainer 17 in the form of a web of substantially rectangular shape, having a width slightly less than that of the skirt band 12 and of substantially the same width as the skirt band reinforcing ribbon 15, but greater than the internal diameter of the ring. This ring retainer 17 is desirably of nylon and with the reefing ring 14 centrally located thereon, is secured to the reinforced skirt band 12 on opposite sides of the ring and to the side sections of the corresponding radial ribbon 13 by stitching 18 preferably with nylon thread, as shown in FIG. 2. The ring retainer 17 is secured to the reinforced skirt band 12 and to the corresponding radial ribbon 13 in the manner described, with the bottom edge of said ring retainer in registry with the bottom edge of the skirt band, so that a marginal portion 19 of the skirt band extends beyond the upper edge of the ring retainer and skirt band reinforcement ribbon 15. The ring retainer 17 is also symmetrically arranged with respect to the radial ribbon, to locate the reefing ring 14 on the medial line of the radial ribbon. Although the ring retainer 17 is of flexible material, the reefing ring 14 is positively retained centrally thereon by the confronting ends of the two series of stitching 18 close to and on opposite sides of the ring.

With the preliminary installing stage for the reefing ring 14 completed as described and as illustrated in FIG. 2, a reinforcing web 20 of rectangular shape is wrapped around the reinforced skirt band 12 and the corresponding end section of the ring retainer 17 on each side of the reefing ring 14 and is firmly secured thereto by stitching 21 passing through the different layers of material at the wrapped region, as shown in FIGS. 3 and 4. The reinforcing web 20 forms three contiguous folds of substantially the same length, two adjoining folds 22 and 23 flanking the reinforced skirt band 12 and the ring retainer 17, and the outer end fold 24 extending upwardly inside the parachute and terminating in an exposed end edge 26 extending a short distance below the upper fold line 27 of the reinforcing web 20. The web 20 is wrapped as close to the corresponding radial ribbon 13 as is practicable, without squeezing or deforming the ribbon, and is wound firmly around the different layers of material at the wrapped region, so that the upper projecting marginal portion 19 of the skirt band 12 is folded over.

The reinforcing web 20 is desirably of nylon and the stitching 21 therefore is desirably done with nylon thread and does not run over or extend beyond the exposed end 26 of this web. To prevent ravelling or fraying of this exposed end 26 of the reinforcing web 20, the end of the web may be seared before it is applied, to fuse its thermoplastic nylon fibers into an integral unit. The other end 28 of the reinforcing web 20 being protectively covered inside the wrapping convolutions of said web, need not be so seared, but to facilitate winding of the web without the necessity of first determining which end is seared, and to assure that whichever way the web may be folded, the exposed end will always be seared, it is desirable to have both ends of the web seared before wrapping therewith.

When the shroud or suspension lines 16, shown in the form of webs, are subjected to heavy side loads as distinguished from normal loads along the length of such lines, these suspension lines may tear at the joint where they are connected to the skirt band 12. As shown in FIGS. 5 and 6, means for reinforcing the suspension lines 16 against the effect of heavy side loads can readily be incorporated in the reefing ring mounting in accordance with the present invention. In such case, the preliminary installing stage for the reefing ring is the same as illustrated in FIG. 2 and previously described, but in the final installing stage, instead of employing reinforcing webs 20 confined to the reinforced skirt band 12 and ring retainer 17, as shown in FIGS. 3 and 4, there are employed reinforcing webs 20a which are firmly secured at their ends to the reinforced skirt band 12 and to the suspension line 16 respectively. For that purpose, each reinforcing web 20a has an end portion 30 wrapped around the reinforced skirt band 12 and the section of the ring retainer 17 on the corresponding side of the reefing ring 14 and firmly connected thereto by stitching 31 and has its opposite end portion 32 extending along the corresponding suspension line 16 and firmly secured thereto by stitching 33 to form a tab reinforcement for said suspension line. The two end portions 30 and 32 of each reinforcing web 20a are interconnected by an intermediate portion 34 inclined in relation to said end portions and serving as ties between said end portions to transmit side loads on the suspension line 16 to the reinforced skirt band 12. For that reason, this intermediate web portion 34 should be free from slack, so that side loads on the suspension line 16 in either direction will be transmitted to the reinforced skirt band 12 without lost motion.

The reinforcing webs 20a are desirably of uniform width, and although the end portions 30 and 32 of these webs lay flat against the webs and materials to which they are stitched, the intermediate portions 34 may be slightly distorted, especially if these intermediate portions are pulled taut, as shown in FIG. 5. However, this slight distortion is not a disadvantage. Moreover, any side pull on the suspension line 16 tends to align the intermediate portion 34 of the reinforcing web 20a with its end portions 30 and 32 and thereby to flatten out said intermediate portion.

The reinforcing webs 20a are desirably of nylon tubular webbing and the stitchings 31 and 33 are made with nylon thread. The wrapped around end portion 30 of each of these reinforcing webs forms three contiguous folds, two adjoining folds 35 and 36 being disposed on opposite faces of the reinforced skirt band 12 and the ring retainer 17 in face contact therewith, and the outer end fold 37 extending downwardly on the outside of the parachute and merging into the inclined intermediate portion 34 of the reinforcing web. The end portion 30 of each reinforcing web 20a is wrapped as close to the corresponding radial ribbon 13 as is practicable, without squeezing or deforming the ribbon, and is wound firmly around the different layers of material and the wrapped region, so that the upper projecting marginal portion 19 of the skirt band 12 is folded over.

The two tab extensions 32 of the two reinforcing webs 20a arranged face to face in longitudinally aligned overlapping relationship are laid flat against the outside of the suspension line 16 in longitudinal alignment therewith, and are firmly secured thereto by the stitching 33 as described. The lower ends of these tab extensions 32 are folded inwardly and secured to the suspension line 16 by stitching 38, as for example, with nylon thread, to prevent fraying or unravelling at these ends.

Although the width of the wrapped around end portion of each reinforcing web 20a is not as wide as the width of the reinforcing web 20 in the construction of FIGS. 3 and 4, the reinforcement afforded by the connection of this web 20a to the suspension line 16, permits the use of the narrower web 20a without significant loss of strength in the reefing ring mounting.

While the invention has been described with particular reference to specific embodiments, it is to be understood that it is not to be limited thereto but is to be construed broadly and restricted solely by the scope of the appended claims.

What is claimed is:

1. In a ribbon parachute having a series of circumferential ribbons including a skirt band and a series of radial ribbons secured to said circumferential ribbons, the combination comprising a series of reefing rings, and means for mounting said rings at the regions of said skirt band respectively where the radial ribbons cross, the mounting means for each reefing ring comprising a ring retainer web of flexible material threaded through the ring and having sections on opposite sides of the ring and on opposite sides of the corresponding radial ribbon extending along the skirt band and stitched to said skirt band, and a pair of reinforcing webs of flexible material wrapped around and stitched to the ring retainer web and to spaced sections respectively of the skirt band on opposite sides of the ring and of the corresponding radial ribbon.

2. In a ribbon parachute as described in claim 1, wherein the ring retaining web is stitched not only to said skirt band but also to the side sections of the corresponding radial ribbon.

3. In a parachute having a skirt band of nylon, the combination as described in claim 1, wherein the ring retaining webs and the reinforcing webs are also of nylon, and wherein the stitchings of the ring retaining webs to the skirt band and of the reinforcing webs to the ring retaning webs and to the skirt band are with nylon threads.

4. In a parachute having a skirt and a series of suspension lines extending from spaced points along said skirt, a series of reefing rings, and means for mounting said rings in spaced relationship along said skirt in the regions of said suspension lines respectively, the mounting means for each ring including reinforcing web means secured to said skirt and having tab means secured to the suspension line in the region of said ring to reinforce said suspension line against side loads.

5. In a parachute having a skirt band, and a series of suspension lines extending from spaced points along said skirt, a series of reefing rings, and means for mounting said rings in spaced relationship along said skirt band in substantial alignment with said suspension lines respectively, the mounting means for each reefing ring comprising a ring retainer web of flexible material threaded through the ring and having sections on opposite sides of the ring stitched to said skirt band, and a pair of reinforcing webs of flexible material wrapped around and stitched to the ring retainer web and to the skirt band at sections respectively on opposite sides of the ring, said reinforcing webs having respective extension extending along and secured to the suspension line in alignment with said ring to reinforce said suspension line against side loads.

6. In a parachute having a skirt band, and a series of suspension lines in the form of webs extending from spaced points along said skirt, a series of reefing rings, and means for mounting said rings in spaced relationship along said skirt band and in alignment with corresponding suspension lines respectively, the mounting means for each reefing ring comprising a ring retainer web of flexible material threaded through the ring and having sections on opposite sides of the ring stitched to said skirt band, and a pair of reinforcing webs of flexible material in ribbon form having respective portions at one end wrapped around and stitched to the ring retainer web and to the skirt band at sections respectively on opposite sides of the ring and having respective tab portions at the other end arranged face to face in longitudinally aligned overlapping relationship and secured flat against the corresponding suspension line in longitudinal alignment therewith by stitching, to reinforce said suspension line against side loads.

7. In a parachute having a skirt band spaced from the main body of the canopy of the parachute, a series of reefing rings, and means for mounting said rings in spaced relationship along said skirt band on the inside thereof, the mounting means for each reefing ring comprising a ring retainer web of flexible material on the inner side of said skirt band threaded through the ring and having sections on opposite sides of the ring extending along the skirt band and stitched to said skirt band at sections spaced therealong, and a pair of reinforcing webs of flexible material wrapped around and stitched to the ring retainer web and to spaced sections respectively of the skirt band on opposite sides of the ring.

References Cited in the file of this patent

UNITED STATES PATENTS

| | | |
|---|---|---|
| 2,520,931 | Heinrich | Sept. 5, 1950 |
| 2,527,972 | Tauty | Oct. 31, 1950 |
| 2,626,117 | Heinrich | Jan. 20, 1953 |

FOREIGN PATENTS

| | | |
|---|---|---|
| 500,519 | Italy | Nov. 19, 1954 |

OTHER REFERENCES

Summary Report No. F–Su–1107–ND, published May 1946, 244–142. Headquarters Air Material Command, Wright Field, Dayton, Ohio, page 6 relied upon.